United States Patent [19]

Yoshimura et al.

[11] Patent Number: 5,585,055
[45] Date of Patent: Dec. 17, 1996

[54] METHOD OF MANUFACTURING A COMPOSITE CERAMICS SINTERED BODY

[75] Inventors: Masashi Yoshimura, Hyogo; Koichi Niihara, Osaka, both of Japan

[73] Assignee: Sumitomo Electric Industries, Ltd., Osaka, Japan

[21] Appl. No.: 442,661

[22] Filed: May 17, 1995

Related U.S. Application Data

[60] Division of Ser. No. 159,804, Nov. 30, 1993, Pat. No. 5,459,111, which is a continuation-in-part of Ser. No. 2,335, Jan. 8, 1993, abandoned.

[30] Foreign Application Priority Data

Jan. 21, 1992 [JP] Japan .......................................... 4-8471

[51] Int. Cl.$^6$ ....................................................... B28B 3/00
[52] U.S. Cl. ................................ 264/65; 264/60; 264/122
[58] Field of Search ................................ 264/60, 65, 122

[56] References Cited

U.S. PATENT DOCUMENTS

| | | |
|---|---|---|
| 3,798,040 | 3/1974 | Kamin et al. . |
| 4,502,983 | 3/1985 | Omori et al. . |
| 4,569,921 | 2/1986 | Omori et al. ........................... 501/88 |
| 4,729,972 | 3/1988 | Kodama et al. . |

FOREIGN PATENT DOCUMENTS 51-056815  5/1976  Japan .
2233322  1/1991  United Kingdom .

OTHER PUBLICATIONS

B. Elvers et al., Ullmann's Encyclopedia of Industrial Chemistry, vol. A15; 5th Edition; Weinheim, VCH Verlag, published 1990.

Article Entitled: "Mechanical Properties of $Y_2O_3$–Based Composites" by Masashi Yoshimura et al., Fourth Autumn Symposium, Ceramics Society of Japan (1991).

Japanese Industrial Standard (JIS) "Testing Method for Flexural Strength (Modulus of Rupture) of High Performance Ceramics", pp. 1–5; JIS R 1601–1981.

*Primary Examiner*—Donald E. Czaja
*Assistant Examiner*—Jacqueline A. Ruller
*Attorney, Agent, or Firm*—W. G. Fasse; W. F. Fasse

[57] ABSTRACT

The strength of a composite sintered body including yttrium oxide is improved. A composite ceramics sintered body includes a matrix of yttrium oxide and silicon carbide particles dispersed within the matrix. A compound oxide phase including yttrium and silicon is present at the surface of the sintered body. A sintered body is obtained by compression-molding mixed powder including yttrium oxide powder and silicon carbide powder in an inert gas atmosphere of at least 1550° C. The sintered body is subjected to a heat treatment for at least 0.5 hour and not more than 12 hours in an atmosphere including oxygen gas in the range of at least 900° C. and less than 1200° C.

12 Claims, 2 Drawing Sheets

METHOD OF MANUFACTURING A COMPOSITE CERAMICS SINTERED BODY

CROSS-REFERENCE TO RELATED APPLICATION(S)

This is a DIVISIONAL of U.S. patent application Ser. No. 08/159,804, filed Nov. 30, 1993, now U.S. Pat. No. 5,459,111, which in turn is a CIP application of U.S. Ser. No. 08/002,335, filed Jan. 8, 1993, (now abandoned).

BACKGROUND OF THE INVENTION

1. Field of the Invention

The present invention relates-to a composite ceramics sintered body and especially a method of manufacturing such a sintered body. More particularly, it relates to a composite ceramics sintered body containing yttrium oxide ($Y_2O_3$) having heat resistance and high strength to be employed as structural ceramics, and especially a method of manufacturing the same.

2. Description of the Background Art

Yttrium oxide, which is a compound having a high melting point, has an excellent stability under a high temperature. Such yttrium oxide is potentiality useful as a high temperature structural material or as translucent ceramics material.

However, yttrium oxide has not yet been put into practical usage as a structural material, due to its inferior mechanical properties as compared with currently available oxide ceramics such as aluminum oxide ($Al_2O_3$) or zirconium oxide ($ZrO_2$). Various approaches have been made to improve its strength by adding an additive to a sintered body mainly composed of yttrium oxide. According to a study made by the inventors of the present application, it has been recognized that the strength of a sintered body having a matrix of yttrium oxide can be improved by dispersing silicon carbide (SiC) therein. The result of this experiment has been reported by the inventors in Fourth Autumn Symposium, Ceramics Society of Japan, 1991.

However, when silicon carbide is simply dispersed in an yttrium oxide matrix, the flexural strength (fracture strength) of the resulting sintered body is at the level of 300 MPa at the utmost. This level is not sufficient for practical usage of a sintered body mainly composed of yttrium oxide available as structural ceramics.

SUMMARY OF THE INVENTION

It is an object of the present invention to improve the mechanical strength of a ceramics sintered body including yttrium oxide as a matrix.

The present invention is directed to a composite ceramics sintered body including a matrix of yttrium oxide and silicon carbide particles dispersed within the matrix, and is characterized in that a compound oxide phase including yttrium and silicon is present at the surface of the sintered body, preferably essentially only at the surface.

According to a method of manufacturing a composite ceramics sintered body of the present invention, a mixed powder including yttrium oxide powder and silicon carbide powder is prepared. The mixed powder is compression-molded in an inert gas atmosphere at a temperature of at least 1550° C. to obtain a sintered body. This sintered body is subjected to a heat treatment in an atmosphere including oxygen gas at a temperature of at least 900° C. and less than 1200° C. for a duration of at least 0.5 hour and not more than 12 hours.

The composite ceramics sintered body according to the present invention contains at least yttrium oxide ($Y_2O_3$) and silicon carbide (SiC). In particular, the present ceramics sintered body has a structure obtained by dispersing silicon carbide powder in an yttrium oxide powder. The sintered body according to the present invention is heat-treated in the atmosphere or an atmosphere containing oxygen gas, to be improved in flexural strength. Although not yet sufficiently clarified, the mechanism of such improvement in flexural strength attained by the heat treatment could be attributed to phenomena such as that the silicon carbide contained in the sintered body is oxidized and volume-expanded to cause compressive stress on the surface of the sintered body, or a compound oxide containing yttrium and silicon, for example $Y_2SiO_5$, is precipitated on the surface of the sintered body to cause residual stress. This compound oxide phase exists around the silicon carbide particles. It is conceivable that the flexural strength of the sintered body is improved by the heat treatment in the atmosphere containing oxygen due to an action effected by the combination of the yttrium oxide that diffuses oxygen and the oxidized silicon carbide.

According to the present invention, a composite ceramics sintered body having a strength higher than that of a conventional ceramics sintered body containing yttrium oxide and silicon carbide is provided that can be used as a structural material.

The foregoing and other objects, features, aspects and advantages of the present invention will become more apparent from the following detailed description of the present invention when taken in conjunction with the accompanying drawings.

BRIEF DESCRIPTION OF THE ACCOMPANYING DRAWINGS

FIG. 1A shows schematically a structure of the surface of a composite ceramics sintered body of the present invention.

FIG. 1B schematically shows an internal structure of a composite ceramics sintered body of the present invention.

FIG. 2 is a graph showing the relationship between the amount of silicon carbide contained in the composite ceramics sintered body of the present invention and flexural strength.

DESCRIPTION OF THE PREFERRED EMBODIMENTS

Example 1

Figure 1B:
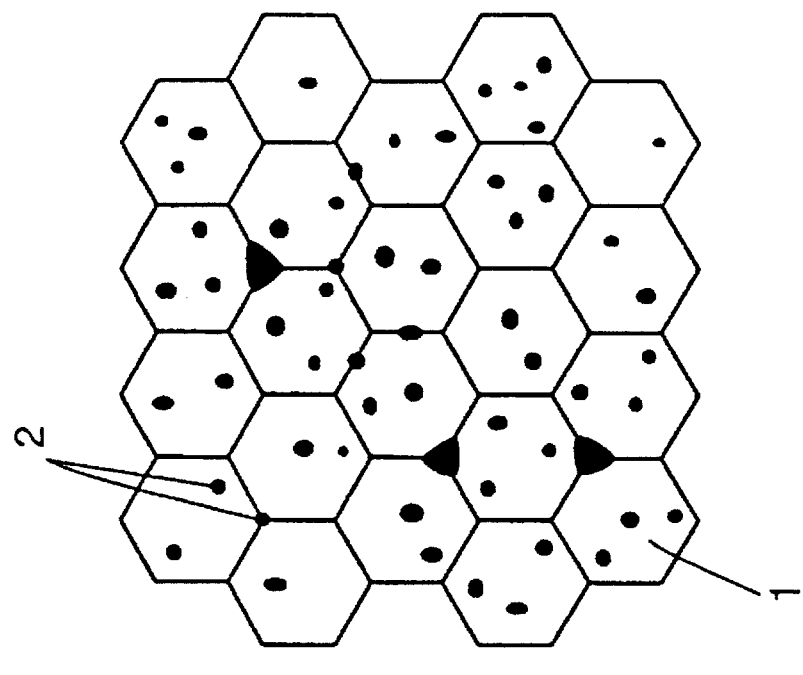
Figure 1A:
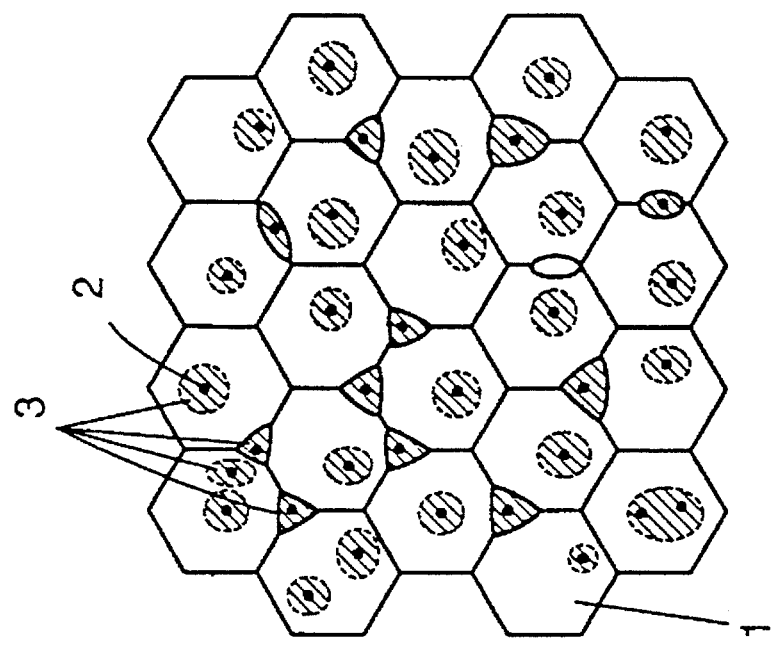

Referring to FIG. 1A, silicon carbide (SiC) particles 2 are scattered within an yttrium oxide ($Y_2O_3$) particle 1 or at the grain boundary of the yttrium oxide ($Y_2O_3$) particles 1 at the surface portion of a ceramics sintered body of the present invention. A compound oxide phase 3 including yttrium and silicon exists around each silicon carbide particle 2. Referring to FIG. 1B, silicon carbide particles 2 are scattered within the yttrium oxide particle 1 or at the grain boundary of the yttrium oxide particles 1 inside the sintered body of the present invention.

Yttrium oxide powder of 0.4 μm in mean particle diameter and silicon carbide powder of 0.3 μm in mean particle diameter were wet-blended at a prescribed ratio in butanol for 50 hours with a ball mill (Step a Table 1). Then the mixed powder was dried and subjected to hot press sintering in an argon flow at a temperature of 1550° C. to 1700° C. for one hour (Step b Table 1). Test pieces were prepared from the obtained sintered body to be subjected to a flexural test according to JIS R 1601.

The test pieces were subjected to three-point flexural tests at room temperature. The flexural tests were carried out on test pieces following the sintering (Step b, Table 1) Further test pieces were subjected following the sintering to a heat treatment in the atmosphere at a temperature of 900° C. for 30 minutes and then tested (Step c, Table 1). The flexural tests were carried out on 15 test pieces respectively to obtain an average strength.

Figure 2:
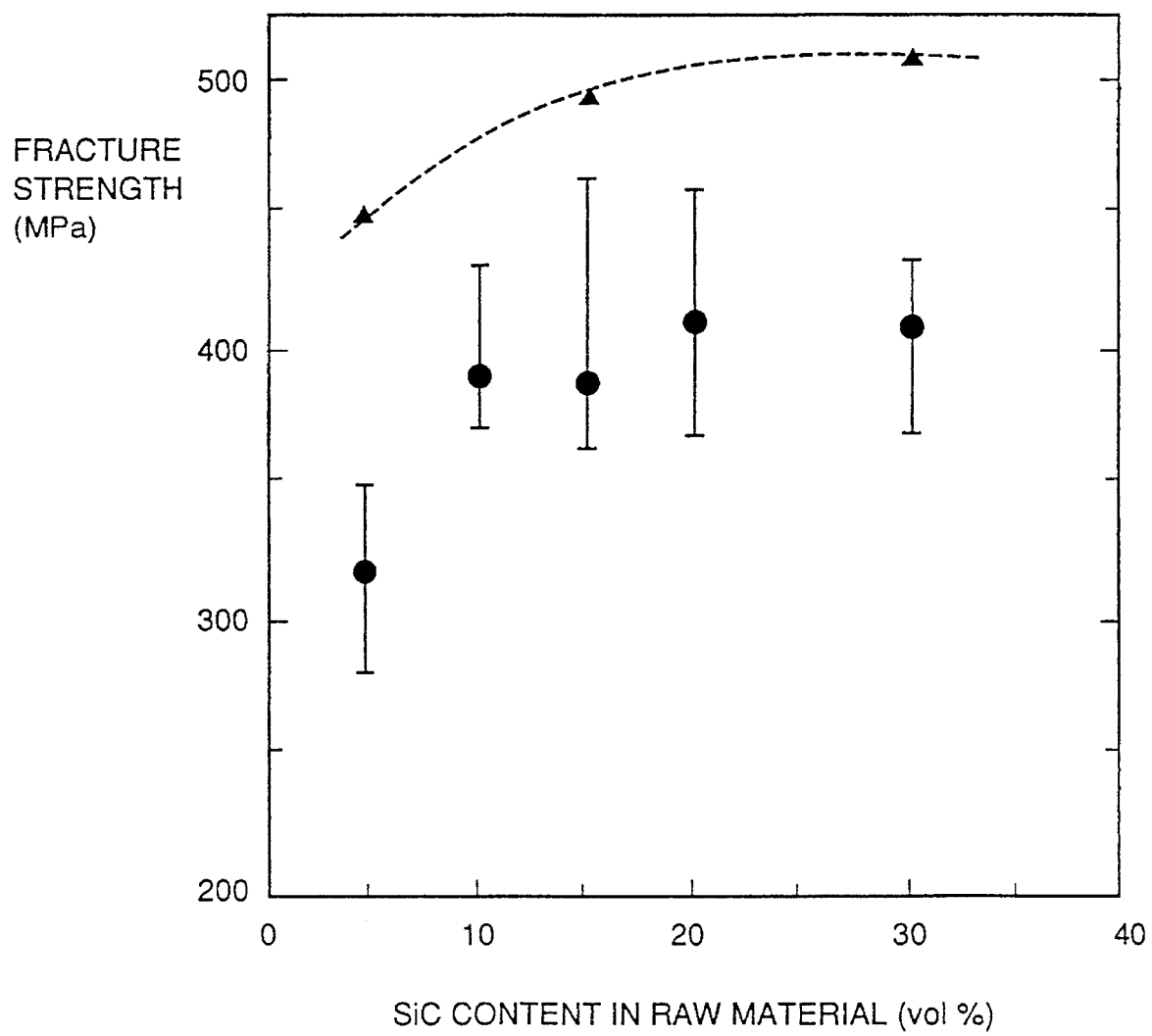

The measured results of the flexural tests are shown in Table 1 and FIG. 2. Referring to FIG. 2, black circles show the flexural strength (fracture strength) measured on the sintered test pieces. Black triangles show the flexural strength (fracture strength) measured on sintered and heat treated test pieces. It can be seen from FIG. 2 that the fracture strength is improved by approximately 30% by virtue of the heat treatment.

tests were carried out on the obtained test pieces. The measured results of the flexural strength (fracture strength) are shown in Tables 2 and 3.

TABLE 2

| Number | Processing Temperature (°C.) | Duration (hr) | Stength (MPa) |
|---|---|---|---|
| 4 | *700 | 0.5 | 390 |
|   | *    | 3.0 | 385 |
|   | *800 | 0.5 | 392 |
|   | 900  | 0.1 | 402 |
|   |      | 0.5 | 480 |
|   |      | 5.0 | 490 |
|   |      | 10.0 | 484 |
|   |      | 12.0 | 460 |
|   |      | 13.0 | 390 |
|   |      | 15.0 | 350 |
|   | 1000 | 0.5 | 460 |
|   |      | 15.0 | 370 |
|   | 1100 | 0.5 | 462 |
|   | *1200 | 0.5 | 350 |

TABLE 1

| Sample Number | Step a | | Step b | | | | Step c | |
|---|---|---|---|---|---|---|---|---|
|   | $Y_2O_3$ (Vol. %) | SiC (Vol. %) | Sintering Temperature (°C.) | Applied Pressure (MPa) | Relative Density (%) | Strength (MPa) | Strength (MPa) | Strength Improvement (%) |
| *1 | 100 | 0 | 1400 | 30 | 99.9 | 150 | 150 | 0 |
| *2 | 96 | 4 | 1550 | 30 | 99.9 | 310 | 440 | 42 |
| 3 | 95 | 5 | 1550 | 30 | 99.8 | 320 | 450 | 41 |
| 4 | 90 | 10 | 1600 | 30 | 99.7 | 392 | 480 | 22 |
| 5 | 85 | 15 | 1600 | 30 | 99.5 | 387 | 490 | 27 |
| 6 | 80 | 20 | 1600 | 30 | 99.5 | 412 | 500 | 21 |
| 7 | 70 | 30 | 1650 | 30 | 99.0 | 410 | 520 | 27 |
| *8 | 65 | 35 | 1650 | 30 | 98.0 | 408 | 510 | 24 |
| *9 | 60 | 40 | 1700 | 30 | 98.5 | 405 | 500 | 23 |

*Example for Comparison

It is apparent from Table 1 that the strength of the sintered body is improved by carrying out a heat treatment step following the sintering. This increase in strength is noticeable when the added amount of silicon carbide powder is within the range of 5–30% by volume, whereby high strength is obtained.

In the present example, the composition of the material powder of each sample was determined quantitatively as shown in Table 1. However, it was difficult to measure quantitatively the composition of the eventual sintered body. That is to say, although the main form of a compound oxide of yttrium and silicon formed on the surface of the sintered body is $Y_2SiO_5$, there are other various forms existing. It is therefore difficult to identify quantitatively the containing ratio of $Y_2O_3$, SiC, $Y_2SiO_5$ or the like to the whole sintered body. However, the yttrium oxide powder content of the starting mixture should be at least 70% by volume.

Example 2

Sintered bodies were obtained from sample numbers 3 and 7 of the sintered bodies prepared according to Example 1. The sintered bodies were subjected to thermal treatments under the atmosphere for time periods shown in Tables 2 and 3 at temperature of 700° C., 800° C., 900° C., 1000° C., 1100° C., 1200° C., and 1300° C., respectively. Similar to Example 1, test pieces were prepared from each heat-treated sintered body according to JIS R 1601. Three-point flexural TABLE 2-continued

| Number | Processing Temperature (°C.) | Duration (hr) | Stength (MPa) |
|---|---|---|---|
|   | *    | 1.0 | 353 |
|   | *1300 | 0.5 | 250 |
|   | *    | 1.0 | 228 |

*Example for Comparison

TABLE 3

| Number | Processing Temperature (°C.) | Duration (hr) | Stength (MPa) |
|---|---|---|---|
| 7 | *700 | 0.5 | 400 |
|   | *    |     | 405 |
|   | *800 | 0.5 | 395 |
|   | 900  | 0.1 | 430 |
|   |      | 0.5 | 520 |
|   |      | 1.0 | 522 |
|   |      | 5.0 | 523 |
|   |      | 10.0 | 520 |
|   |      | 12.0 | 510 |
|   |      | 13.0 | 420 |
|   |      | 15.0 | 400 |
|   | 1000 | 0.1 | 440 |
|   |      | 0.5 | 510 |
|   |      | 15.0 | 405 |
|   | 1100 | 0.5 | 500 |
|   | *1200 | 13.0 | 420 |

TABLE 3-continued

| Number | Processing Temperature (°C.) | Duration (hr) | Stength (MPa) |
|---|---|---|---|
| | * | 0.5 | 405 |
| | | 1.0 | 400 |
| | *1300 | 0.5 | 240 |
| | * | 1.0 | 230 |

*Example for Comparison

By carrying out the heat treatment for at least 0.5 hour and not more than 12 hours at a temperature within the range of at least 900° C. and less than 1200° C., the flexural strength was significantly improved.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manufacturing a composite ceramic sintered body comprising the steps of:

preparing a mixed powder including at least 70% by volume and at most 95% by volume of yttrium oxide powder and at least 5% by volume and at most 30% by volume of silicon carbide powder, compression-molding said mixed powder in an inert gas atmosphere of a temperature of at least 1550° C. to obtain a sintered body, and applying a heat treatment to said sintered body for at least 0.5 hour and at most 12 hours in an atmosphere including oxygen gas of a temperature of at least 900° C. and less than 1200° C.

2. The method of claim 1, wherein said heat treatment is carried out for at least 1.0 hour and not more than 10 hours.

3. The method of claim 1, wherein said heat treatment is carried out for about 5 hours.

4. The method of claim 1, wherein said heat treatment causes an increase of at least 21% in a flexural strength of said sintered body.

5. The method of claim 1, wherein said heat treatment causes precipitation of a compound oxide phase containing yttrium and silicon in said sintered body.

6. The method of claim 5, wherein said precipitation is essentially limited to a layer at a surface of said sintered body.

7. The method of claim 5, wherein said precipitation forms said compound oxide phase as a coating on individual silicon carbide particles in said sintered body.

8. The method of claim 5, wherein said compound oxide phase comprises $Y_2SiO_5$.

9. The method of claim 1, wherein said yttrium oxide powder in said step of preparing a mixed powder has a mean particle diameter of 0.4 µm, and said silicon carbide powder in said step of preparing a mixed powder has a mean particle diameter of 0.3 µm.

10. The method of claim 1, wherein said compression-molding comprises hot press sintering, said inert gas atmosphere comprises argon, and said compression-molding temperature is at least 1550° C. and not more than 1700° C.

11. The method of claim 1, wherein said compression-molding temperature is not more than 1650° C.

12. The method of claim 1, wherein said compression-molding is carried out to achieve a relative density of at least 99% of said sintered body.

* * * * *

UNITED STATES PATENT AND TRADEMARK OFFICE
CERTIFICATE OF CORRECTION

PATENT NO. : 5,585,055
DATED : December 17, 1996
INVENTOR(S) : Yoshimura et al.

It is certified that error appears in the above-identified patent and that said Letters Patent is hereby corrected as shown below:

```
Col. 2, line 52, delete "Example 1",
        between lines 62 and 63 insert "Example 1",
        line 66, insert "," after --(Step a--,
Col. 3, line 2,  insert "," after --(Step b--,
        line 7,  insert "." after --Table 1)--,
```

Signed and Sealed this

Thirteenth Day of May, 1997

Attest:

BRUCE LEHMAN

*Attesting Officer*     *Commissioner of Patents and Trademarks*